United States Patent
Kadav et al.

(10) Patent No.: US 10,402,235 B2
(45) Date of Patent: *Sep. 3, 2019

(54) FINE-GRAIN SYNCHRONIZATION IN DATA-PARALLEL JOBS FOR DISTRIBUTED MACHINE LEARNING

(71) Applicant: NEC Laboratories America, Inc., Princeton, NJ (US)

(72) Inventors: Asim Kadav, Jersey City, NJ (US); Erik Kruus, East Hillsborough, NJ (US)

(73) Assignee: NEC CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,196

(22) Filed: May 15, 2018

(65) Prior Publication Data

US 2018/0260256 A1   Sep. 13, 2018

Related U.S. Application Data

(63) Continuation-in-part of application No. 15/480,874, filed on Apr. 6, 2017.
(Continued)

(51) Int. Cl.
*G06F 9/46* (2006.01)
*G06F 9/52* (2006.01)
(Continued)

(52) U.S. Cl.
CPC ............ *G06F 9/522* (2013.01); *G06N 20/00* (2019.01); *H04L 67/1095* (2013.01)

(58) Field of Classification Search
CPC .................................. G06F 9/52; G06F 9/522
(Continued)

(56) References Cited

U.S. PATENT DOCUMENTS 7,512,950 B1 * 3/2009 Marejka ............... G06F 9/52
   718/102
8,250,133 B2 * 8/2012 Blumrich ............... G06F 9/52
   709/201
(Continued)

OTHER PUBLICATIONS

"Unsynchronized Techniques for Approximate Parallel Computing"; Martin C. Rinard—MIT EECS and CSAIL; RACES Workshop, 2012.*
(Continued)

*Primary Examiner* — Francisco J Aponte
(74) *Attorney, Agent, or Firm* — Joseph Kolodka

(57) ABSTRACT

A computer-implemented method and computer processing system are provided. The method includes synchronizing, by a processor, respective ones of a plurality of data parallel workers with respect to an iterative distributed machine learning process. The synchronizing step includes individually continuing, by the respective ones of the plurality of data parallel workers, from a current iteration to a subsequent iteration of the iterative distributed machine learning process, responsive to a satisfaction of a predetermined condition thereby. The predetermined condition includes individually sending a per-receiver notification from each sending one of the plurality of data parallel workers to each receiving one of the plurality of data parallel workers, responsive to a sending of data there between. The predetermined condition further includes individually sending a per-receiver acknowledgement from the receiving one to the sending one, responsive to a consumption of the data thereby.

2 Claims, 9 Drawing Sheets

Related U.S. Application Data

(60) Provisional application No. 62/322,849, filed on Apr. 15, 2016.

(51) Int. Cl.
*G06N 20/00* (2019.01)
*H04L 29/08* (2006.01)

(58) Field of Classification Search
USPC .................................... 717/149; 718/106
See application file for complete search history.

(56) References Cited

U.S. PATENT DOCUMENTS

| | | | | |
|---|---|---|---|---|
| 8,607,247 | B2* | 12/2013 | Howes | G06F 9/522 718/106 |
| 8,656,400 | B2* | 2/2014 | Foo | G06F 9/3851 718/102 |
| 8,832,712 | B2* | 9/2014 | Houston | G06F 9/522 714/39 |
| 8,839,216 | B2* | 9/2014 | Liu | G06F 8/4441 717/151 |
| 8,875,146 | B2* | 10/2014 | McCready | G06F 9/4881 718/103 |
| 9,207,977 | B2* | 12/2015 | Easwaran | G06F 9/4887 |
| 9,235,769 | B2* | 1/2016 | Oro Garcia | G06K 9/00973 |
| 9,612,868 | B2* | 4/2017 | Easwaran | G06F 9/4881 |
| 9,984,337 | B2* | 5/2018 | Kadav | G06F 17/30174 |
| 2004/0263519 | A1* | 12/2004 | Andrews | G06F 15/7846 345/502 |
| 2006/0212868 | A1* | 9/2006 | Takayama | G06F 9/52 718/100 |
| 2007/0118494 | A1* | 5/2007 | Jannarone | G06K 9/6202 706/52 |
| 2008/0104367 | A1* | 5/2008 | Blumrich | G06F 15/17381 712/11 |
| 2009/0006808 | A1* | 1/2009 | Blumrich | G06F 15/17337 712/12 |
| 2009/0037707 | A1* | 2/2009 | Blocksome | G06F 9/52 712/231 |
| 2009/0240890 | A1* | 9/2009 | Collard | G06F 9/52 711/125 |
| 2011/0219280 | A1* | 9/2011 | Blumrich | H03M 13/09 714/748 |
| 2013/0024662 | A1* | 1/2013 | Renganarayana | G06F 9/3004 712/208 |
| 2013/0145379 | A1* | 6/2013 | Faraj | G06F 9/522 718/106 |
| 2015/0033000 | A1* | 1/2015 | Vorbach | G06F 12/1433 712/221 |
| 2016/0011996 | A1* | 1/2016 | Asaad | G06F 15/76 710/308 |

OTHER PUBLICATIONS

"Synchronization Trade-offs in GPU implementations of Graph Algorithms"; Rashid Kaleem, Anand Venkat, Sreepathi Pai, Mary Hall, Keshav Pingali. 2016 IEEE International Parallel and Distributed Processing Symposium.*

"Exploiting Fine-Grained Data Parallelism with Chip Multiprocessors and Fast Barriers"; Jack Sampson, Ruben Gonzalez, Jean-Francois Collard, Norman P. Jouppi, Mike Schlansker, Brad Calder. The 39th Annual IEEE/ACM International Symposium on Microarchitecture (MICRO'06).*

"Fine-grain Parallelism with Minimal Hardware Support: A Compiler-Controlled Threaded Abstract Machine"; David E. Culler Anurag Sah, Klaus Erik Schauser, Thorsten von Eicken John Wawrzynek. Computer Science Division, EECS Department University of California, Berkeley. 1991 ACM.*

Dean et al., "Large Scale Distributed Deep Networks", NIPS 2012, Dec. 2012, pp. 1-9.

Li et al., "Scaling Distributed Machine Learning with the Parameter Server", Proceedings of the 11th USENIX Symposium on Operating Systems Design and Implementation, Oct. 2014, 17 pages.

Dean et al., "MapReduce: Simplied Data Processing on Large Clusters", 6th USENIX Symposium on Operating Systems Design and Implementation 2004, Aug. 2004, 13 pages.

Valliant, Leslie G., "A Bridging Model for Parallel Computation", Communication of the ACM, Aug. 1990, pp. 103-111, vol. 33, No. 8.

* cited by examiner

FINE-GRAIN SYNCHRONIZATION IN DATA-PARALLEL JOBS FOR DISTRIBUTED MACHINE LEARNING

RELATED APPLICATION INFORMATION

This application is a continuation-in-part of U.S. patent application Ser. No. 15/480,874, filed on Apr. 6, 2017, entitled "Fine-Grain Synchronization in Data-Parallel Jobs for Distributed Machine Learning", incorporated herein by reference. This application is also related to another continuation-in-part of U.S. patent application Ser. No. 15/480,874, filed on Apr. 6, 2017, entitled "Communication Efficient Sparse-Reduce in Distributed Machine Learning", filed concurrently herewith, incorporated herein by reference.

BACKGROUND

Technical Field

The present invention relates to information processing, and more particularly to fine-grain synchronization in data-parallel jobs for distributed machine learning.

Description of the Related Art

Big-data processing involves multiple parallel workers, or multiple workers and a single master. Existing worker synchronization is typically performed using a barrier primitive or via a file-system (stage wise synchronization). Examples of big-data processing tasks include data parallel tasks such as large-scale machine learning and graph analysis. Specific tasks with distributed machine learning include training data-parallel models for large-scale surveillance, language translation, and image recognition.

In large-scale surveillance, large-scale surveillance models can be captured on tens of thousands of training set videos. These videos can be trained over data-parallel distributed machine learning systems. Each node in a distributed training replica processes a bunch of videos and updates the training model. The nodes then coordinate and share the updates periodically. Finally, this trained model is deployed in vehicular systems or surveillance systems to run predictions.

In these parallel learning systems, models learn on new data using algorithms such as gradient descent to generate an update to the model parameters. Individual models periodically transmit model updates in an "all-reduce" step. Model updates can be parameters or gradients. Herein, parameter updates and gradient updates can be collectively referred to as "model updates". Moreover, the terms "machine" and "node" are used interchangeably herein. All-reduce is a parallel programming primitive in which an aggregate function (such as average) of locally computed models is computed and sent to all nodes. The models receive gradients and average them with their own locally computed sub-gradients, on every iteration (or every few iterations). However, if the network of nodes is sparsely connected, the convergence may be slow due to stale updates being passed around. However, there are savings in network and CPU costs (fewer updates), that may result in an overall speedup.

Barrier synchronization is an important and widely used operation for synchronizing parallel systems. Upon encountering a barrier operation, a process waits until all processes in the system have reached a barrier. The barrier operation is the most commonly used synchronization primitive in data-parallel primitive.

However, this style of synchronization suffers from several problems. First, barrier primitives are slow and removing such a primitive (asynchronous) breaks down correctness semantics. Second, most barrier implementations synchronize with all processes and may be slow to synchronize a subset of workers. Third, using a barrier with the bulk-synchronous processing paradigm described suffers from mixed-version issues; that is, in absence of receive side synchronization, there may be torn-reads and over-writes. This is because a barrier gives no information if the recipient has seen or processed the gradient and additional expensive synchronization may be required. Finally, using a barrier also causes network resource spikes since all workers will send intermediate values at the same time.

Additionally, adding extra barriers before/after push and reduce does not product a strongly consistent BSP that can incorporate model updates from all replicates since the actual send operation may be synchronous and there is not guarantee that receives receive these messages when they perform a reduce. Unless a blocking receiver is added after every send, the consistency is not guaranteed. However, this introduces a significant synchronization overhead.

Thus, there is a need for improved synchronization in data parallel jobs, particularly involving large-scale surveillance.

SUMMARY

According to an aspect of the present invention, a computer-implemented method is provided. The method includes synchronizing, by a processor, respective ones of a plurality of data parallel workers with respect to an iterative distributed machine learning process. The synchronizing step includes individually continuing, by the respective ones of the plurality of data parallel workers, from a current iteration to a subsequent iteration of the iterative distributed machine learning process, responsive to a satisfaction of a predetermined condition thereby. The predetermined condition includes individually sending a per-receiver notification from each sending one of the plurality of data parallel workers to each receiving one of the plurality of data parallel workers, responsive to a sending of data there between. The predetermined condition further includes individually sending a per-receiver acknowledgement from the receiving one to the sending one, responsive to a consumption of the data thereby.

According to another aspect of the present invention, a computer program product is provided for data synchronization. The computer program product includes a non-transitory computer readable storage medium having program instructions embodied therewith. The program instructions are executable by a computer to cause the computer to perform a method. The method includes synchronizing, by a processor, respective ones of a plurality of data parallel workers with respect to an iterative distributed machine learning process. The synchronizing step includes individually continuing, by the respective ones of the plurality of data parallel workers, from a current iteration to a subsequent iteration of the iterative distributed machine learning process, responsive to a satisfaction of a predetermined condition thereby. The predetermined condition includes individually sending a per-receiver notification from each sending one of the plurality of data parallel workers to each receiving one of the plurality of data parallel workers, responsive to a sending of data there between. The predetermined condition further includes individually sending a per-receiver acknowledgement from the receiving one to the sending one, responsive to a consumption of the data thereby.

According to yet another aspect of the present invention, a computer processing system is provided. The computer processing system includes a processor. The processor is configured to synchronize respective ones of a plurality of data parallel workers with respect to an iterative distributed machine learning process. The processor permits the respective ones of the plurality of data parallel workers to individually continue from a current iteration to a subsequent iteration of the iterative distributed machine learning process, responsive to a satisfaction of the predetermined condition thereby. The predetermined condition includes (i) individually sending a per-receiver notification from each sending one of the plurality of data parallel workers to each receiving one of the plurality of data parallel workers, responsive to a sending of data there between, and (ii) individually sending a per-receiver acknowledgement from the receiving one to the sending one, responsive to a consumption of the data thereby.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
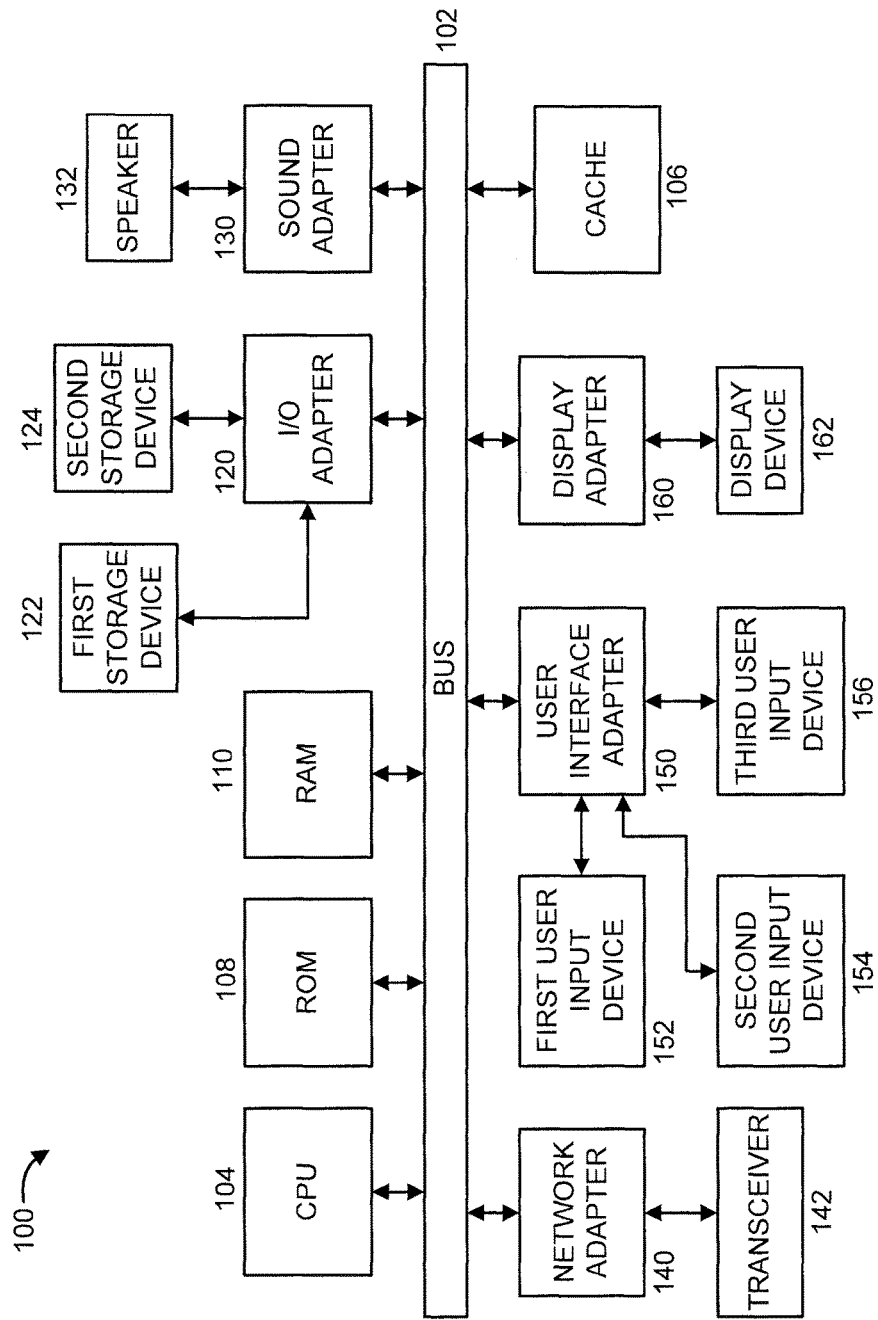
FIG. 1 is a block diagram illustrating an exemplary processing system to which the present principles may be applied, according to an embodiment of the present principles.

In an embodiment, the present invention relates to fine-grain synchronization in data-parallel jobs for distributed machine learning.

In another embodiment, the present invention relates to fine-grained synchronization for data-parallel tasks in a big data processing environment.

In yet another embodiment, the present invention relates to communication efficient sparse-reduce in distributed machine learning. This embodiment can involve providing a methodology to determine the underlying sparse network Hence, embodiments of the present invention will be initially described with respect to fine-grained synchronization in data parallel jobs in a big data processing environment. Thereafter, embodiments of the present invention will be described with respect to fine-grained synchronization in data parallel jobs for distributed machine learning. Thereafter still, embodiments of the present invention will be described with respect to communication efficient sparse-reduce in distributed machine learning. As readily appreciated by one of ordinary skill in the art, the preceding embodiments will likely have overlapping disclosure aspects given their underlying relation to each other.

The description relating to distributed machine learning may be so provided relative to large scale surveillance for the sake of illustration and concreteness. However, as readily appreciated by one of ordinary skill in the art, the present invention can be applied to a myriad of other distributed machine learning based applications, given the teachings of the present invention provided herein, while maintaining the spirit of the present invention.

The description will now commence relating to fine-grained synchronization for data-parallel tasks in a big data processing environment.

In an embodiment, in order to provide an efficient wait mechanism for partial reduce operations, the present invention uses a notify mechanism with respect to the sender when sending updated output values to the sender. With parallel threads over a shared memory or Remote Direct Memory Access (RDMA), a send operation may not notify the receiver about the incoming parameters. In an embodiment of the present invention, a per-receiver notification allows for fine-grained synchronization and removes the inefficiency that is introduced by a global barrier.

To reduce the barrier overhead for partial-reduce operations and for strong consistency, the present invention provides a notify-ack (notify-acknowledgement) based mechanism that gives stricter guarantees than a single barrier and can improve performance in some cases. All processes compute and send their model parameters and send notifications to the receivers. The receiver consumes the model parameters and performs a reduce operation and sends an acknowledgment to all its senders indicating that it has consumed its gradient. Hence, when using a notify-ack based service, each receiver acknowledges processing of incoming model parameters to the receivers. This removes the problem of mixed-version vectors. Furthermore, this fine-grained synchronization allows efficient implementation of partial reduce operations since each sender is only blocked on its incoming receivers.

Fine-grained synchronization in accordance with the present invention achieves correctness and performance improvements over many big data, data parallel jobs. Such big data, data parallel jobs include, but are not limited to, machine learning, graph processing, log processing, and so forth. Essentially, the present invention can be applied to any parallel computing environment, as readily appreciated by one of ordinary skill in the art, given the teachings of the present invention provided herein. To the preceding and other applications, the present invention provides: (i) faster processing; (ii) correct execution and synchronization semantics as compared to a barrier; and (iii) load balanced network sharing.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the CPU 104 and/or other elements of system 100 via system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
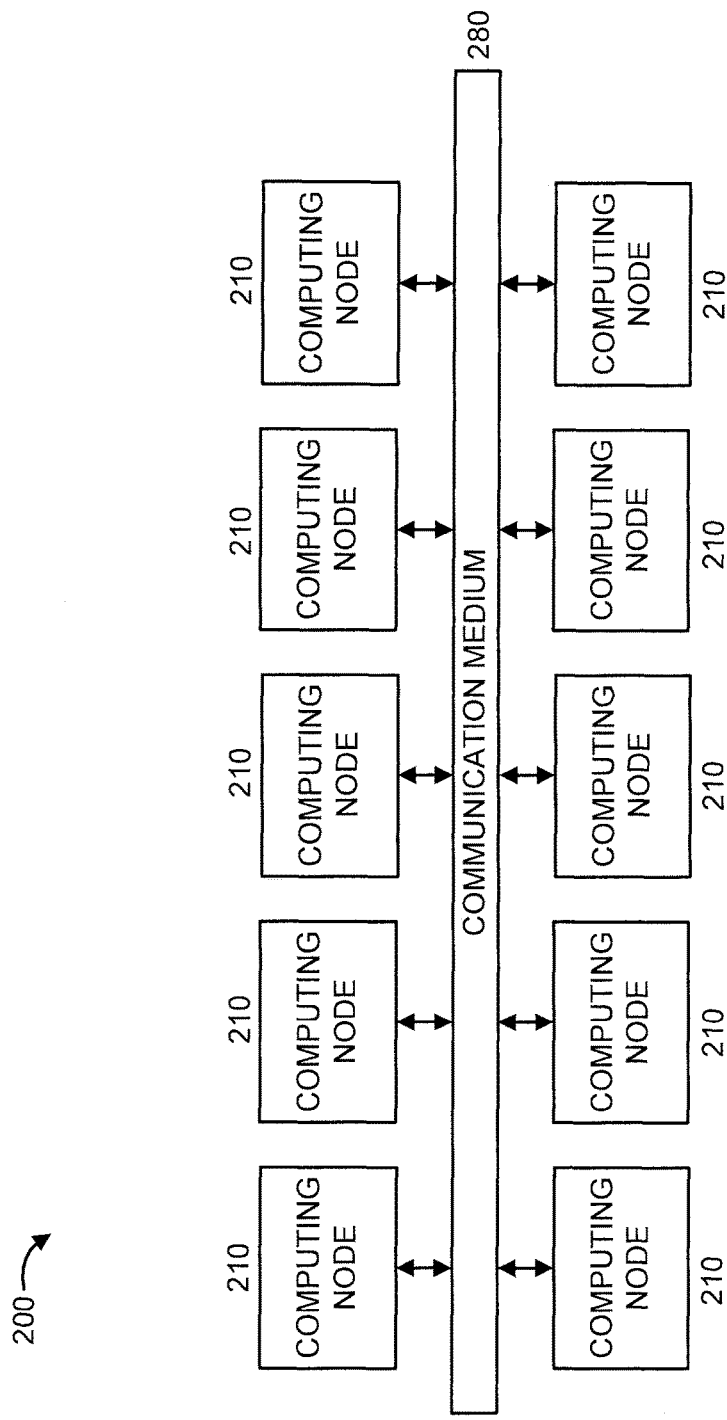
FIG. 2 shows an exemplary environment to which the present invention can be applied, in accordance with an embodiment of the present principles.

Moreover, it is to be appreciated that environment 200 described below with respect to FIG. 2 is an environment for implementing respective embodiments of the present principles. Part or all of processing system 100 may be implemented in one or more of the elements of environment 200.

Figure 5:
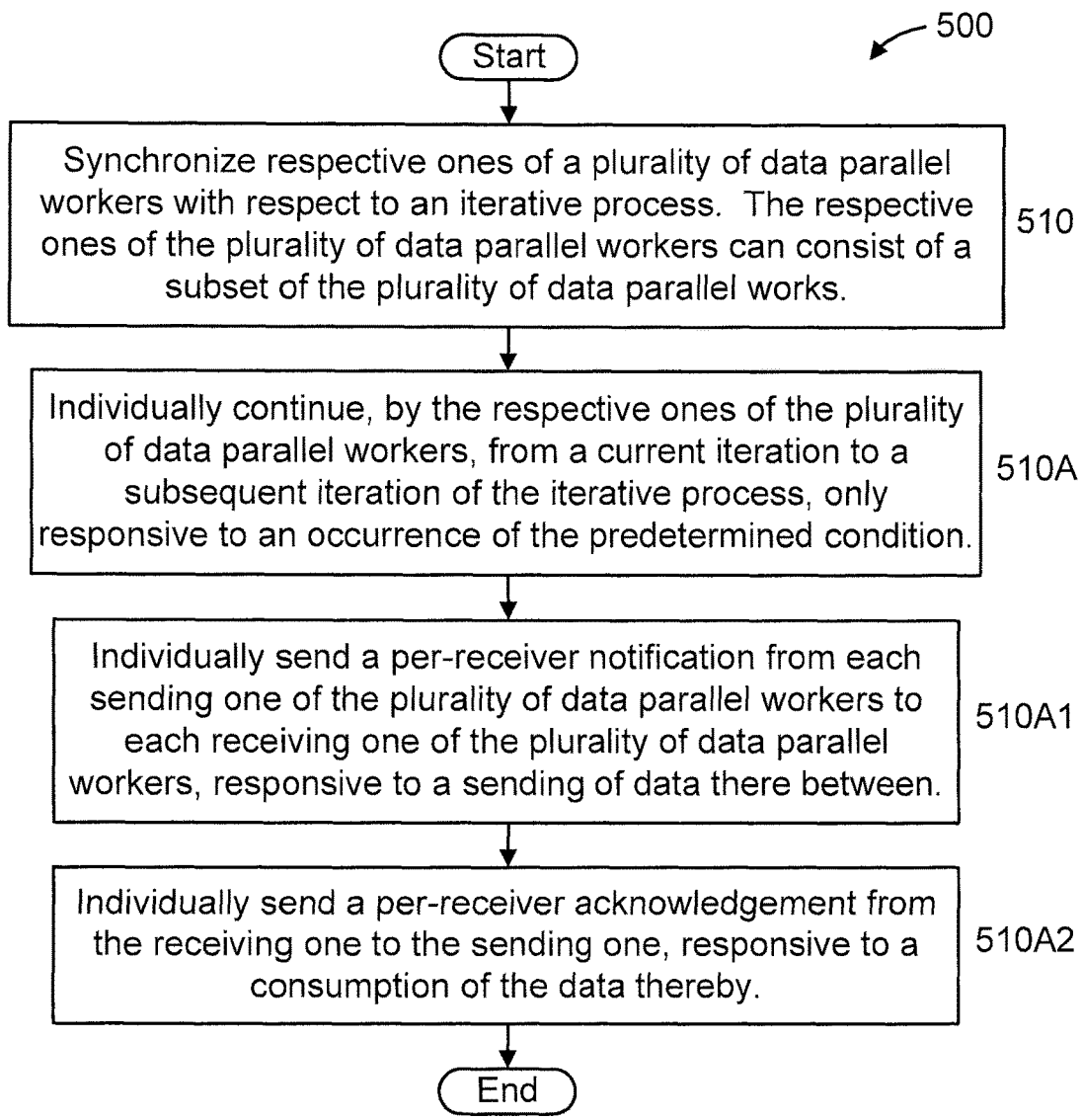
FIG. 5 shows an exemplary method for fine-grain synchronization of data parallel jobs, in accordance with an embodiment of the present principles.
Figure 6:
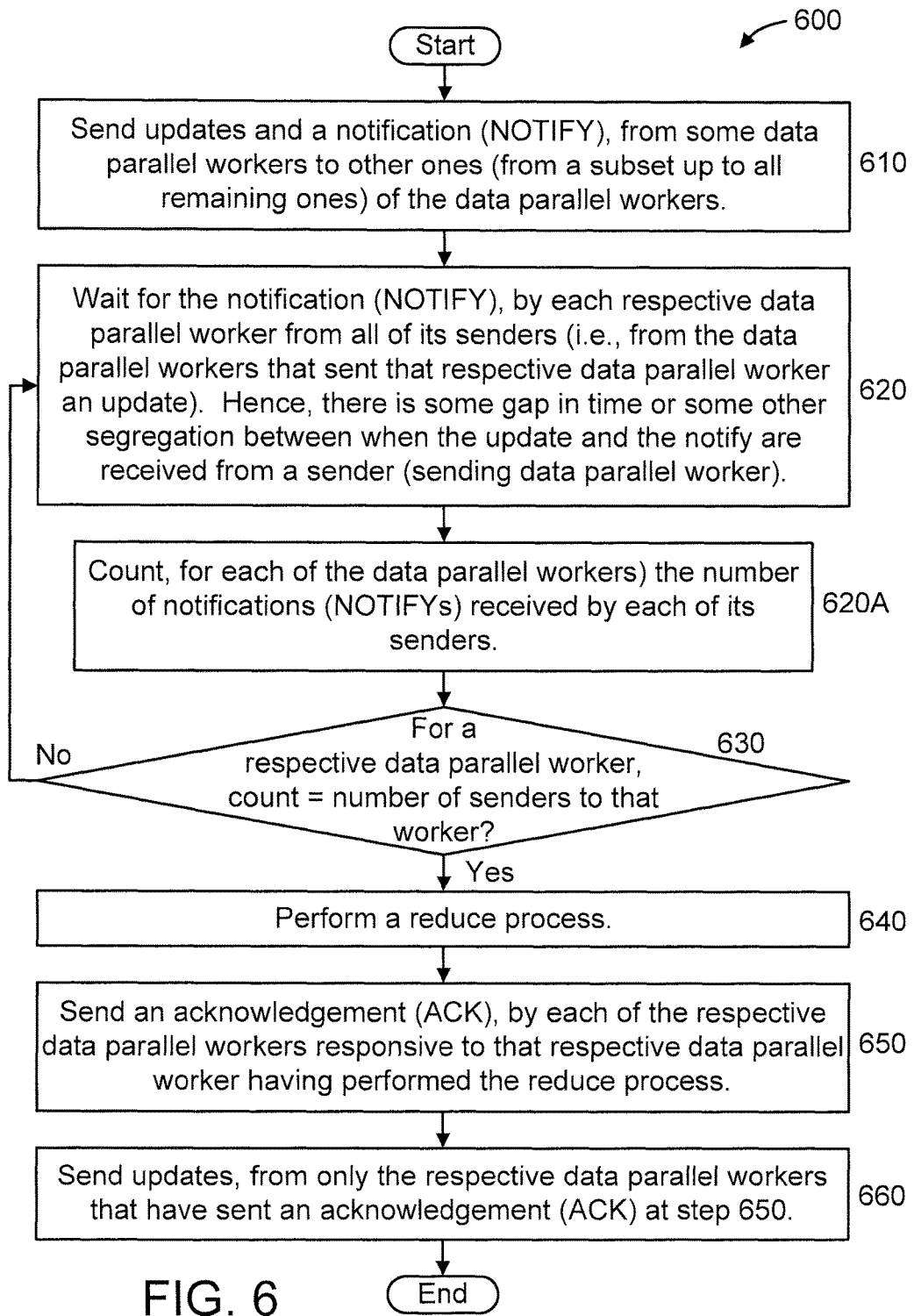
FIG. 6 shows another exemplary method for fine-grain synchronization of data parallel jobs, in accordance with an embodiment of the present principles.
Figure 8:
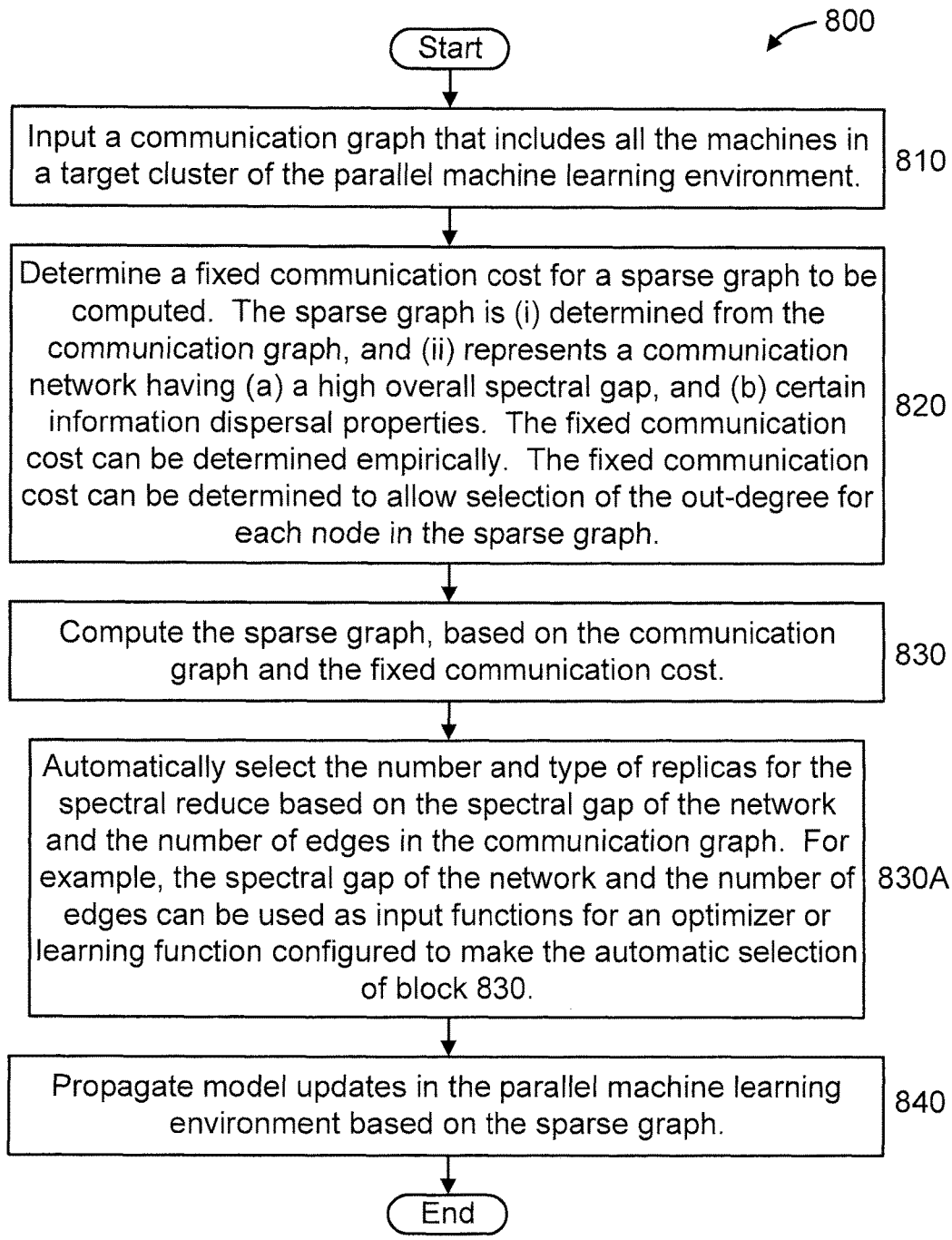
FIG. 8 shows a method for communication efficient sparse-reduce in a distributed machine learning environment, in accordance with an embodiment of the present invention.
Figure 9:
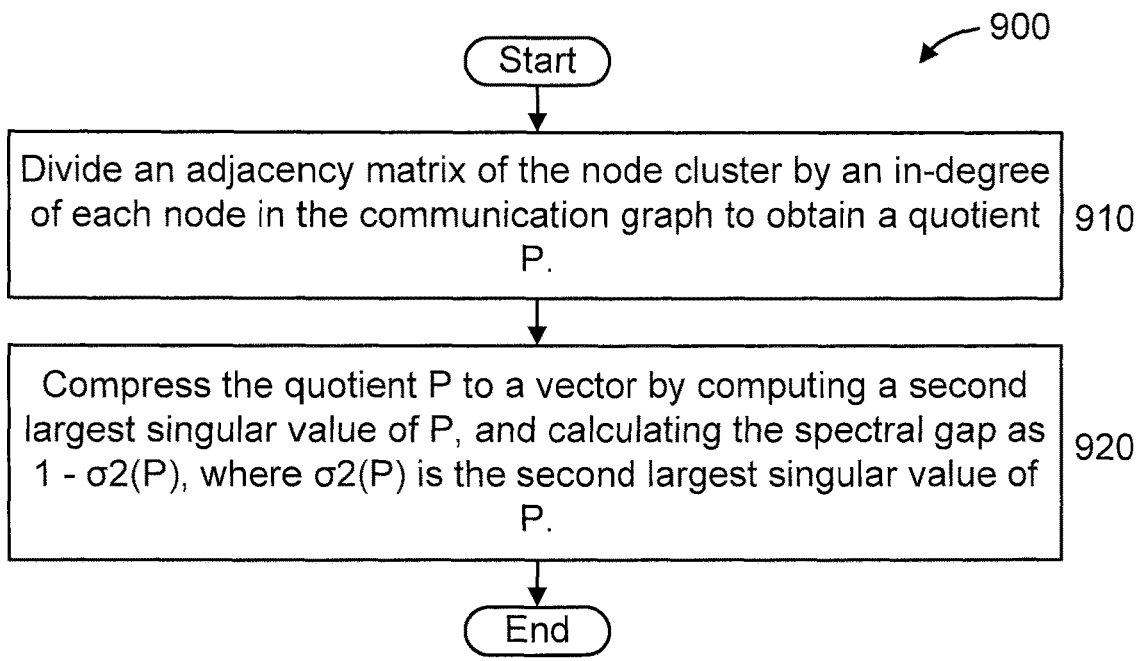
FIG. 9 shows a method for measuring node diffusion efficiency, in accordance with an embodiment of the present invention.

Further, it is to be appreciated that processing system 100 may perform at least part of the method described herein including, for example, at least part of method 500 of FIG. 5 and/or at least part of method 600 of FIG. 6 and/or at least part of method 800 of FIG. 8 and/or at least part of method 900 of FIG. 9. Similarly, part or all of environment 200 may be used to perform at least part of method 500 of FIG. 5 and/or at least part of method 600 of FIG. 6 and/or at least part of method 800 of FIG. 8 and/or at least part of method 900 of FIG. 9.

FIG. 2 shows an exemplary environment 200 to which the present invention can be applied, in accordance with an embodiment of the present principles.

The environment 200 includes a set of computing nodes (collectively and individually denoted by the figure reference numeral 210). Each of the computing nodes in the set 210 is configured to perform data parallel jobs and to perform fine-grained synchronization for the data parallel jobs.

In an embodiment, each of the computing nodes 210 is a parallel worker. In an embodiment, none of the computing nodes 210 is a master node. In another embodiment, one of the computing nodes 210 is a master node.

The set of computing nodes 210 can be configured to implement MapReduce operations, a Message Passing Interface (MPI), and so forth.

The set of computing nodes 210 can be implemented by, for example, separate computing devices (such as, e.g., in a distributed arrangement) or different items (threads, processes, etc.) in a single computing device. Of course, other implementations can also be employed, while maintaining the spirit of the present invention.

The set of computing nodes 210 are interconnected by a communication medium 280. The communication medium 280 can involve any type of communication medium, depending upon the implementation. For example, a bus, a network, a Message Passing Interface (MPI), and so forth can be used, while maintaining the spirit of the present invention.

Figure 3:
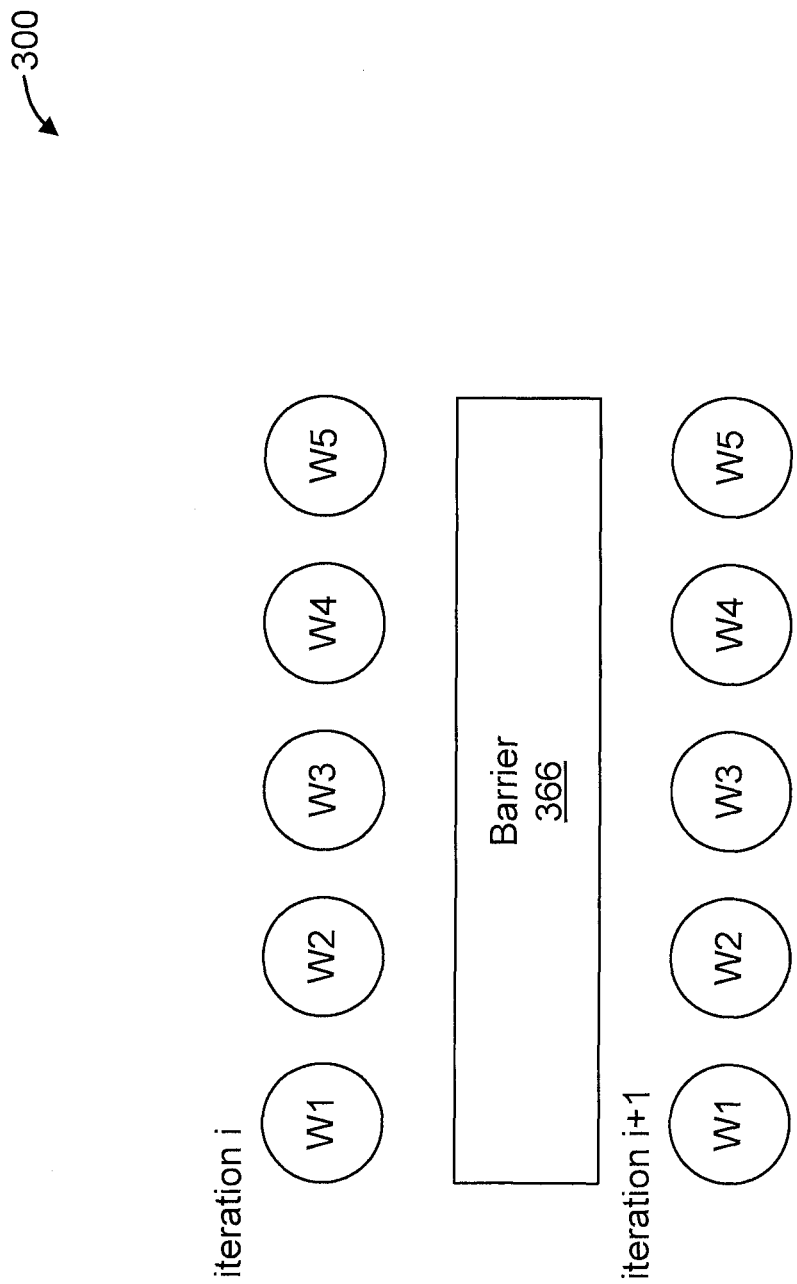
FIG. 3 shows an exemplary synchronization condition to which the present invention can be applied, in accordance with an embodiment of the present principles.

FIG. 3 shows an exemplary synchronization condition 300 to which the present invention can be applied, in accordance with an embodiment of the present principles. The synchronization condition 300 involves workers W1-W5. The following synchronization semantics apply: (i) workers W1, W2 and W3 synchronize with one another; (ii) workers W3, W4 and W5 synchronize with one another. The synchronization condition 300 uses a barrier condition 366.

With the current synchronization methods in Hadoop®, Spark and other machine learning and graph learning frameworks, all workers wait for everyone at the barrier and then proceed to the next iteration.

Figure 4:
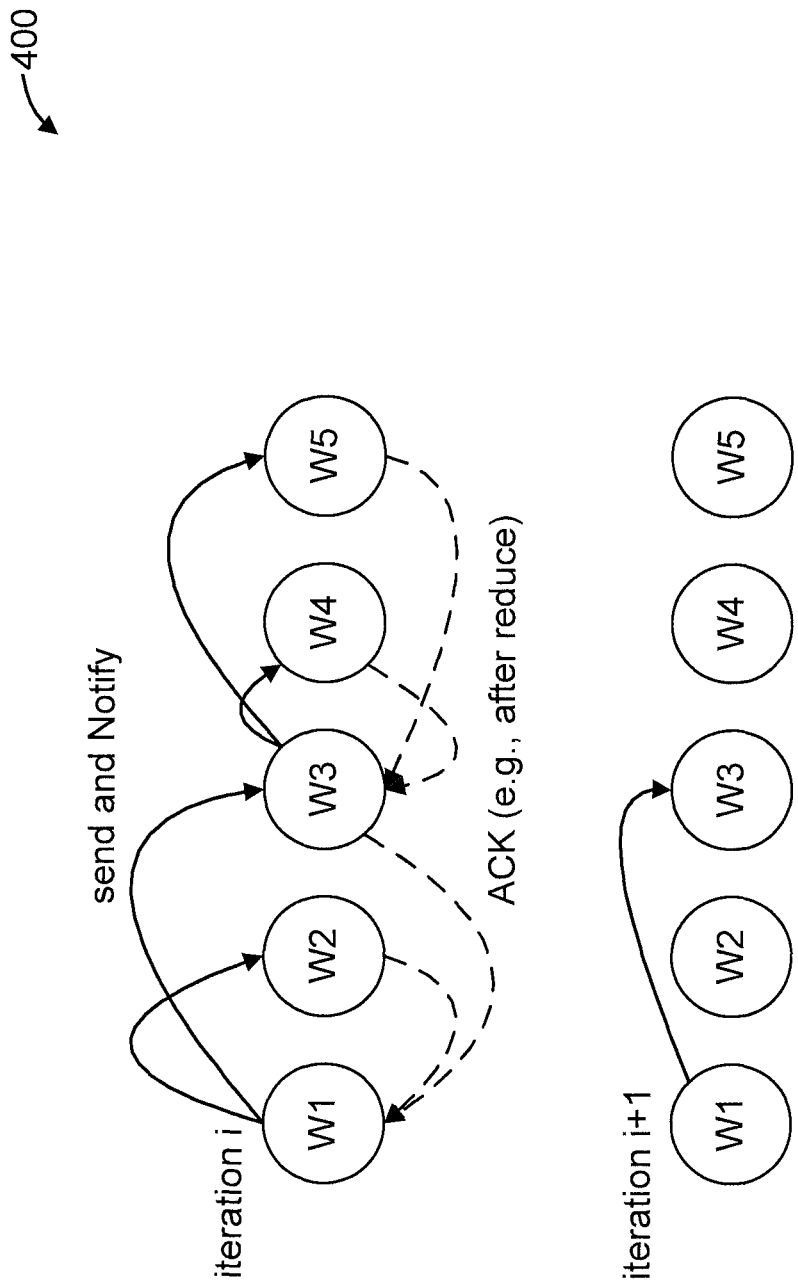
FIG. 4 shows an exemplary synchronization condition, in accordance with an embodiment of the present principles.

FIG. 4 shows an exemplary synchronization condition 400, in accordance with an embodiment of the present principles.

The synchronization condition 400 involves the same workers and synchronization semantics as shown in FIG. 3, with the exception that no barrier condition is used. That is, the synchronization condition 300 does not use a barrier condition.

The solid lines represent a SEND (updates, e.g., but not limited to, model parameters) and a NOTIFY (notification) and the dotted lines represent a corresponding ACK (acknowledgement). The corresponding ACK can be sent by respective ones of the workers, for example, after the respective ones of the workers perform a reduce process. Workers only wait for their dependencies and continue with the next iteration as soon as they receive the NOTIFY from all incoming nodes.

FIG. 5 shows an exemplary method 500 for fine-grain synchronization of data parallel jobs, in accordance with an embodiment of the present principles. In an embodiment, method 500 can be used for data parallel jobs for distributed machine learning.

At step 510, synchronize respective ones of a plurality of data parallel workers with respect to an iterative process. In an embodiment, the respective ones of the plurality of data parallel workers can consist of a subset of the plurality of data parallel works. In an embodiment, the iterative process can be an iterative distributed machine learning process.

In an embodiment, step 510 includes step 510A.

At step 510A, individually continue, by the respective ones of the plurality of data parallel workers, from a current iteration to a subsequent iteration of the iterative process (e.g., an iterative distributed machine learning process), responsive to a satisfaction of the predetermined condition thereby.

In an embodiment, the predetermined condition of step 510A includes steps 510A1 and 510A2.

At step 510A1, individually send a per-receiver notification from each sending one of the plurality of data parallel workers to each receiving one of the plurality of data parallel workers, responsive to a sending of data there between.

At step 510A2, individually send a per-receiver acknowledgement from the receiving one to the sending one, responsive to a consumption of the data thereby.

The method 600 specifically relates to an example where the involved parallel workers performing a reduce process. Of course, the present invention can be applied to other processes that can use and benefit from fine-grain synchronization in accordance with the present invention. In general, workers only wait for intermediate outputs from dependent workers to perform the reduce process. After the reduce process, the workers push more data out when the workers receive an ACK from receivers signaling that the sent parameter update has been consumed.

At step 610, send updates (e.g., model parameters) and a notification (NOTIFY), from some data parallel workers to other ones (from a subset up to all remaining ones) of the data parallel workers.

At step 620, wait for the notification (NOTIFY), by each respective data parallel worker from all of its senders (i.e., from the data parallel workers that sent that respective data parallel worker an update). Hence, there is some gap in time or some other segregation between when the update and the NOTIFY are received from a sender (sending data parallel worker).

In an embodiment, step 620 includes step 620A.

At step 620A, count, for each of the data parallel workers) the number of notifications (NOTIFYs) received by each of its senders.

At step 630, determine, for each respective data parallel worker, whether the count for that respective data parallel worker is equal to the number of all of its senders. If so, then proceed to step 640. Otherwise, return to step 620.

At step 640, perform a reduce process. It is to be appreciated that step 640 is only performed by a respective data parallel worker responsive to the NOTIFY being received by that respective data parallel worker from all of its senders.

At step 650, send an acknowledgement (ACK), by each of the respective data parallel workers responsive to that respective data parallel worker having performed the reduce process.

At step 660, send updates, from only the respective data parallel workers that have sent an acknowledgement (ACK) at step 650.

A description will now be given regarding some of the many attendant features of the present invention relating to at least the embodiments directed to fine-grain synchronization in data-parallel jobs. One feature is the use of fine-grained synchronization instead of a global barrier to synchronize between the workers of a data-parallel jobs. This improves performance if a subset of workers wants to synchronize. Moreover, the present invention reduces torn-reads (reads of incompletely written data) that may occur with barriers. Also, the present invention improves network bandwidth utilization since all workers do not send and wait at the same time.

The description will now commence relating to fine-grained synchronization for data-parallel tasks for distributed machine learning, in accordance with an embodiment of the present invention.

We modify the distributed training in parallel-learning systems for improved coordination and synchronization.

In consideration of applying the present invention for fine-grain synchronization in data parallel jobs for distributed machine learning, in an embodiment, at least some of computing nodes 210 in FIG. 2 can be considered to be located in disparate locations with respect to each other in a distributed configuration, such that communication medium 280 allows for communication between these nodes 210 and can involve various different types and/or configurations of communication mediums, as readily appreciated by one of ordinary skill in the art, given the teachings of the present invention provided herein. That is, the communication types and/or configurations involved can vary from embodiment to embodiment, depending upon the specific application, while maintaining the spirit of the present invention.

Exemplary applications to which embodiments directed fine-grain synchronization in data parallel jobs for distributed machine learning can, in turn, be directed to include, but are not limited to, large-scale surveillance, language translation, and image recognition. The surveillance can be, for example, over a node(s) of GPUs and/or CPUs. Other surveillance targets can also be used, while maintaining the spirit of the present invention. It is to be appreciated that the preceding applications are merely illustrative and, thus, one of ordinary skill in the art given the teachings of the present invention provided herein, would contemplate these and a myriad of other applications to which the present invention can be applied, while maintaining the spirit of the present invention.

A description will now be given regarding some of the many attendant features of the present invention relating to at least the embodiments directed to fine-grain synchronization in data-parallel jobs for distributed machine learning. One feature is faster model training of computing the machine learning models. Other features include correct execution and synchronization semantics as compared to a barrier to generate the models. Still another feature is load balanced network sharing during distributed model training.

The description will now commence relating to communication efficient sparse-reduce in distributed machine learning.

To that end, an embodiment of the present invention provides a novel reduce operation during distributed training of the models such as, for example, surveillance models. Of course, other types of models can also be used including, but noted limited to, language translation models, and image recognition models.

We modify the distributed training in parallel-learning systems for reduced latency during "reduce operation" with the same convergence rates.

We propose a spectral-reduce where we decide on a fixed communication cost and decide on communication architecture such that the overall resulting communication graph has a high spectral gap.

We start with a communication graph that includes all machines in a given cluster. We start with a fixed communication cost, which can be empirically determined and allows us to pick the out-degree of each node in the graph. A goal is how to determine a sparse graph such that the graph has good information dispersal properties with this fixed communication cost. By the term "good information dispersal properties", we mean that the nodes are connected in such a manner that the intermediate output from one node (i.e., parameter updates in the case of parallel machine learning) is dispersed to all other nodes in the fewest (possible) time steps. If the nodes are connected in a chain-like fashion, then the intermediate outputs from node i may spread to i+1 in a single time step but will take N time steps to reach to the last node in the cluster. Hence, intuitively well-connected graphs converge faster but have high communication costs.

In order to measure how every node diffuses its intermediate results (model parameters), we take the adjacency matrix and divide with by the in-degree of each node in the communication graph to obtain a quotient "P". We compress this representation to a vector by computing the second largest singular value of P, and calculate the spectral gap as follows:

$$1-\sigma 2(P),$$

where $\sigma 2(P)$ is the second largest singular value of P (which denotes the transition matrix). The transition matrix P is defined as A/d, where A is the adjacency matrix (including self-loop) and d is the in-degree (including self-loop). The spectral gap here is defined as $\sigma 1(P)-\sigma 2(P)$. However, $\sigma 1(P)$, which denotes the largest singular value, should be 1. Hence, the gap equals $1-\sigma 2(P)$. The high spectral gap ensures that model updates from one node are propagated over the network rapidly ensuring fast convergence. We call this sparse reduce step where the underlying communication node graph has a high spectral gap as "spectral-reduce".

Figure 7:
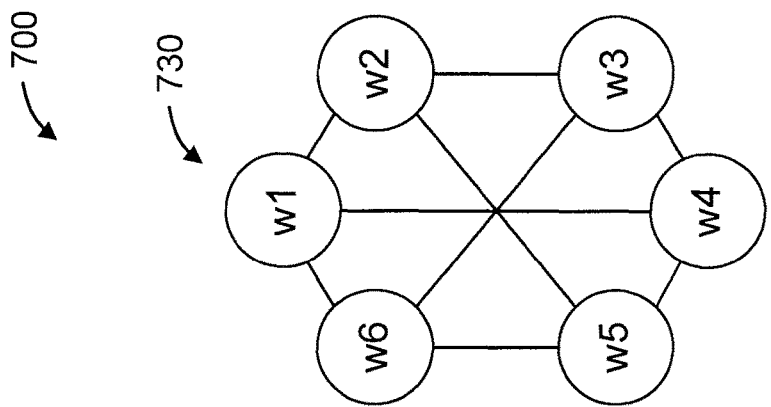
FIG. 7 shows a comparison involving an all-reduce and a parameter server to which the present invention can be applied, and a spectral reduce in accordance with an embodiment of the present invention.
Figure 7:
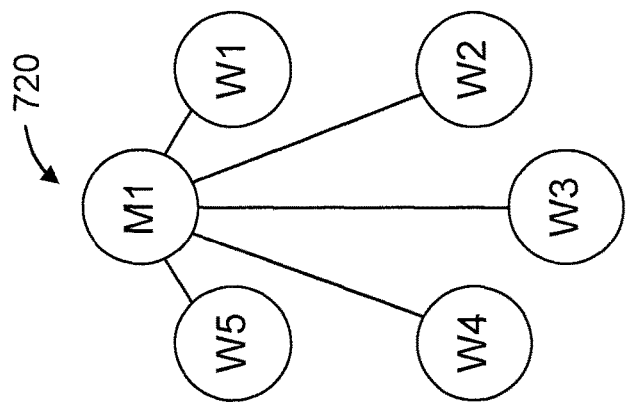
Figure 7:
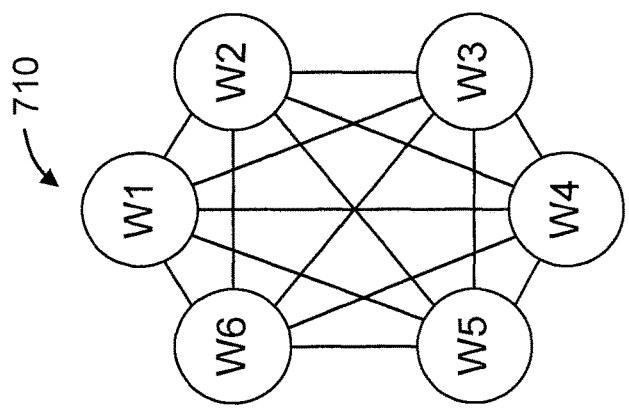

FIG. 7 shows a comparison involving an all-reduce 710 and a parameter server 720 to which the present invention can be applied, and a spectral reduce 730 in accordance with an embodiment of the present invention.

In FIG. 7, a circle having a "W" followed by an integer represents a respective worker (machine), and a circle having a "M" followed by an integer represents a respective machine-learning model. A machine-learning model can include data and model parameters. These machines train machine-learning models on this data iteratively. Every iteration produces a model update. These updates need to be propagated to all other machines that are training in parallel with data from the same dataset. In FIG. 7, the models are shown communicating with all machines to send model updates. All-reduce exchange of model updates. All of the depicted arrows indicate bi-directional communication. As number of nodes (N) grows, the total number of updates transmitted increases to $O(N^2)$.

In particular, all-reduce 710 and parameter server 720 involve existing communication architectures to which the present invention can be applied, in accordance with an embodiment of the present invention. In contrast, the present invention advantageously provides spectral reduce 730, which connects different machines based on an underlying graph with high spectral gap. Instead of all machines sending updates to every other machine, spectral reduce 730 models communication in a sparse fashion such that the underlying node communication graph has a high spectral gap value. This reduces network communication which results in speeding up model training time.

FIG. 8 shows a method 800 for communication efficient sparse-reduce in a distributed machine learning environment, in accordance with an embodiment of the present invention. The method 800 can be used, for example, to reduce the model training time in the parallel processing of machine learning models as applied to various applications including, but not limited to, surveillance, language translation, and image recognition. The method 800 advantageously speeds up the model training time in a parallel machine learning environment by reducing network communication in the parallel machine learning environment. The network communication is reduced by limiting model update propagation in the parallel machine learning environment using a sparse communication model. In an embodiment, the parallel machine learning environment can be a distributed parallel machine learning environment. In an embodiment, method 800 is applied to an iterative distributed machine learning process for distributive training of a set of surveillance models. The set of surveillance models can be trained, for example, to perform a set of surveillance tasks responsive to certain stimuli.

At block 810, input a communication graph that includes all the machines in a target cluster (e.g., to be surveilled and/or otherwise processed/analyzed/etc.) of the parallel machine learning environment. In an embodiment, each machine can be a stand-alone machine (e.g., a server, and so forth) or can be a computing device(s) in a stand-alone machine (e.g., a central processing unit, a graphical processing unit, and so forth). In an embodiment, the communication graph can depict individual machines as nodes and connections of the nodes as edges. Of course, other topology configurations can be used. In an embodiment, the parallel machine learning environment may only include the target cluster (having multiple machines therein for parallel computing). In another embodiment, the parallel machine learning environment may include multiple clusters, each having multiple machines therein for parallel computing, and each processed in accordance with method 200 to ensure optimal communication in each of the multiple clusters.

At block 820, determine a fixed communication cost for a sparse graph to be computed. The sparse graph is (i) determined from the communication graph, and (ii) represents a communication network (for the cluster) having (a) a high overall spectral gap, and (b) certain information dispersal properties. The high overall spectral gap and the certain information dispersal properties are further described herein with respect to at least block 830. In an embodiment, the fixed communication cost can be determined empirically. In an embodiment, the fixed communication cost can be determined to allow selection of the out-degree for each node in the sparse graph.

At block 830, compute the sparse graph, based on the communication graph and the fixed communication cost.

The high overall spectral gap of the sparse graph ensures that model updates from one node of the cluster are propagated over the (cluster) network to other nodes of the cluster rapidly, ensuring fast convergence. As used herein, the term "high overall spectral gap" refers to a value as close to 1 as possible (noting that the spectral gap varies from 0.0 to 1.0). In an embodiment, the high overall spectral gap can be approximated as the second eigenvalue of a brute force search of [low connectivity] circulant graphs and a concrete threshold can be defined as 2.0 times that value. However, in general "as close to 1 as possible" is the preferred high overall spectral gap employed by the present invention. In an embodiment, the overall spectral gap can be determined relative to a minimum overall spectral gap threshold (as described above) such that if the computed overall spectral gap is equal to or greater than the threshold, then the overall spectral gap is considered "high".

As used herein, the term "certain information dispersal properties" can refer to the sparse graph having node connections such that an intermediate output (model update) from a given node disperses to all other nodes of the sparse graph in the fewest time steps (given other possible node connections resulting in different (i.e., more) time steps).

In an embodiment, block 830 includes block 830A.

At block 830A, automatically select the number and type of replicas for the spectral reduce (that is, for computing the sparse graph) based on the spectral gap of the network and the number of edges in the communication graph. As used herein, the term "replica", also interchangeably referred to as "model replica" herein, refers to a model or a model portion that is replicated for the purpose of training the model or the model portion using data-parallel distributed machine learning. For example, the spectral gap of the network and the number of edges can be used as input functions for an optimizer or learning function configured to make the automatic selection of block 830. The optimizer or learning function can be implemented, for example, by software stored in memory 110 and executed by CPU 104 and/or GPU 194.

At block 840, propagate model updates in the parallel machine learning environment based on (e.g., using a topology of) the sparse graph. In this way, the limited communication resulting from use of the sparse graph will limit the overall intra-cluster communication (of model updates), thus speeding up model training.

FIG. 9 shows a method 900 for measuring node diffusion efficiency, in accordance with an embodiment of the present invention.

At block 910, divide an adjacency matrix of the (node) cluster by an in-degree of each node in the communication graph to obtain a quotient P.

At block 920, compress the quotient P to a vector by computing a second largest singular value of P, and calculating the spectral gap as $1-\sigma 2(P)$, where $\sigma 2(P)$ is the second largest singular value of P. The high spectral gap ensures that model updates from one node are propagated over the network rapidly ensuring fast convergence. This sparse reduce step where the underlying communication node graph has a high spectral gap as "spectral-reduce".

A description will now be given regarding some of the many attendant features of the present invention relating to at least the embodiments directed to communication efficient sparse-reduce in distributed machine learning. One feature is that by using a network-efficient parallel model, the resultant training results in faster model training times for all distributed machine learning applications. This happens because of at least the following: (1) the amount of data transmitted is reduced; and (2) in a synchronized implementation, this reduces the number of incoming updates that each node needs to wait before going on to the next iteration. Furthermore, our solution reduces the need for high bandwidth interfaces, reducing costs or freeing up the network for other applications.

This is beneficial because this reduces the turn-around time in retraining the models. For example, for surveillance applications, one may be interested in capturing new events and models periodically. With the present invention, this can be accomplished quickly, reducing the overall time required to update the models with the latest data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
synchronizing, by a processor, respective ones of a plurality of data parallel workers with respect to an iterative distributed machine learning process,
wherein said synchronizing step includes individually continuing, by the respective ones of the plurality of data parallel workers, from a current iteration to a subsequent iteration of the iterative distributive machine learning process, responsive to a satisfaction of a predetermined condition thereby, and
wherein the predetermined condition includes:
individually sending a per-receiver notification from each sending one of the plurality of data parallel workers to each receiving one of the plurality of data parallel workers, responsive to a sending of data there between; and individually sending a per-receiver acknowledgement from the receiving one to the sending one, responsive to a consumption of model parameters of the data thereby;

wherein at least some of the respective ones of the plurality of data parallel workers continue to the subsequent iteration at different times; and wherein the different times are based on respective times at which the predetermined condition is satisfied by the at least some of the respective ones of the plurality of data parallel workers.

2. A computer program product for data synchronization, the computer program product comprising a non-transitory computer readable storage medium having program instructions embodied therewith, the program instructions executable by a computer to cause the computer to perform a method comprising:

synchronizing, by a processor, respective ones of a plurality of data parallel workers with respect to an iterative distributed machine learning process, wherein said synchronizing step includes individually continuing, by the respective ones of the plurality of data parallel workers, from a current iteration to a subsequent iteration of the iterative distributed machine learning process, responsive to a satisfaction of a predetermined condition thereby, and wherein the predetermined condition includes:

individually sending a per-receiver notification from each sending one of the plurality of data parallel workers to each receiving one of the plurality of data parallel workers, responsive to a sending of data there between; and individually sending a per-receiver acknowledgement from the receiving one to the sending one, responsive to a consumption of model parameters of the data thereby;

wherein at least some of the respective ones of the plurality of data parallel workers continue to the subsequent iteration at different times; and wherein the different times are based on respective times at which the predetermined condition is satisfied by the at least some of the respective ones of the plurality of data parallel workers.

* * * * *